(12) United States Patent
Kroeger et al.

(10) Patent No.: US 6,386,849 B1
(45) Date of Patent: May 14, 2002

(54) MULTI-COMPONENT MOLD

(75) Inventors: Charles Kroeger, Upland; Gary Unitt, Etiwanda, both of CA (US)

(73) Assignee: Caco Pacific Corporation, Covina, CA (US)

( * ) Notice: Subject to any disclaimer, the term of this patent is extended or adjusted under 35 U.S.C. 154(b) by 0 days.

(21) Appl. No.: 09/454,535

(22) Filed: Dec. 6, 1999

(51) Int. Cl.⁷ .............................................. B29C 45/16
(52) U.S. Cl. .................... 425/112; 425/121; 425/126.1; 425/556; 425/576; 425/588; 425/436 RM
(58) Field of Search ................................ 425/112, 121, 425/126.1, 556, 576, 588, 436 RM; 264/328.8, 250

(56) References Cited

U.S. PATENT DOCUMENTS

| | | | |
|---|---|---|---|
| 3,557,270 A | 1/1971 | Waid | |
| 4,201,535 A | * 5/1980 | Ninneman | 425/548 |
| 4,243,362 A | * 1/1981 | Rees et al. | 425/130 |
| 4,421,705 A | 12/1983 | Hatakeyama et al. | |
| 4,422,995 A | 12/1983 | Schad | |
| 4,786,455 A | * 11/1988 | Krishnakumar et al. | 264/237 |
| 4,969,811 A | 11/1990 | Littleton | |
| 5,009,587 A | 4/1991 | Corvaglia et al. | |
| 5,123,825 A | 6/1992 | Ernst | |
| 5,324,189 A | 6/1994 | Hendry | |
| 5,700,500 A | 12/1997 | Wilhelm | |
| 5,762,854 A | 6/1998 | Valyi | |
| 5,773,049 A | * 6/1998 | Kashiwa et al. | 425/572 |
| 6,217,818 B1 | * 4/2001 | Collette et al. | 264/513 |

FOREIGN PATENT DOCUMENTS

| | | |
|---|---|---|
| EP | 0117917 A2 | 12/1983 |
| JP | 405245874 | 9/1993 |

* cited by examiner

*Primary Examiner*—Robert Davis
*Assistant Examiner*—Donald Heckenberg
(74) *Attorney, Agent, or Firm*—Sheldon & Mak; Denton L. Anderson

(57) ABSTRACT

The invention is a mold apparatus for making multi-component products. The apparatus includes an elongate turret, a plurality of product connection pairs attached on opposite sides of the turret, a first mold disposed proximate to the turret and a second mold disposed on the opposite side of the turret. The first mold has a plurality of cavities for molding a first molded layer of the multi-component product, and the second mold has cavities for molding a second layer onto the first molded layer. The turret is rotatable between the first mold and the second mold by rotation about its longitudinal axis of the turret.

4 Claims, 4 Drawing Sheets

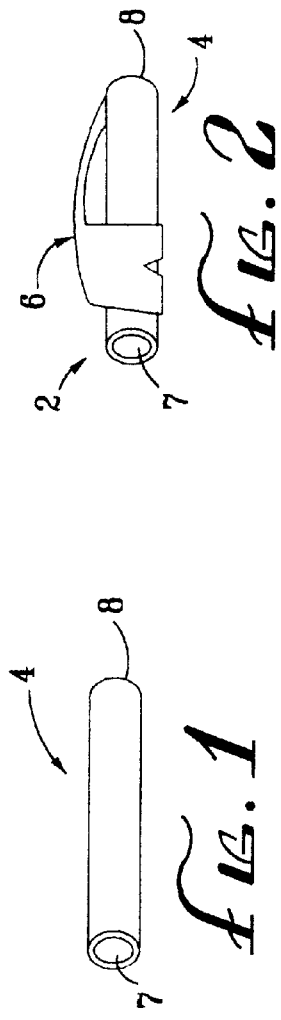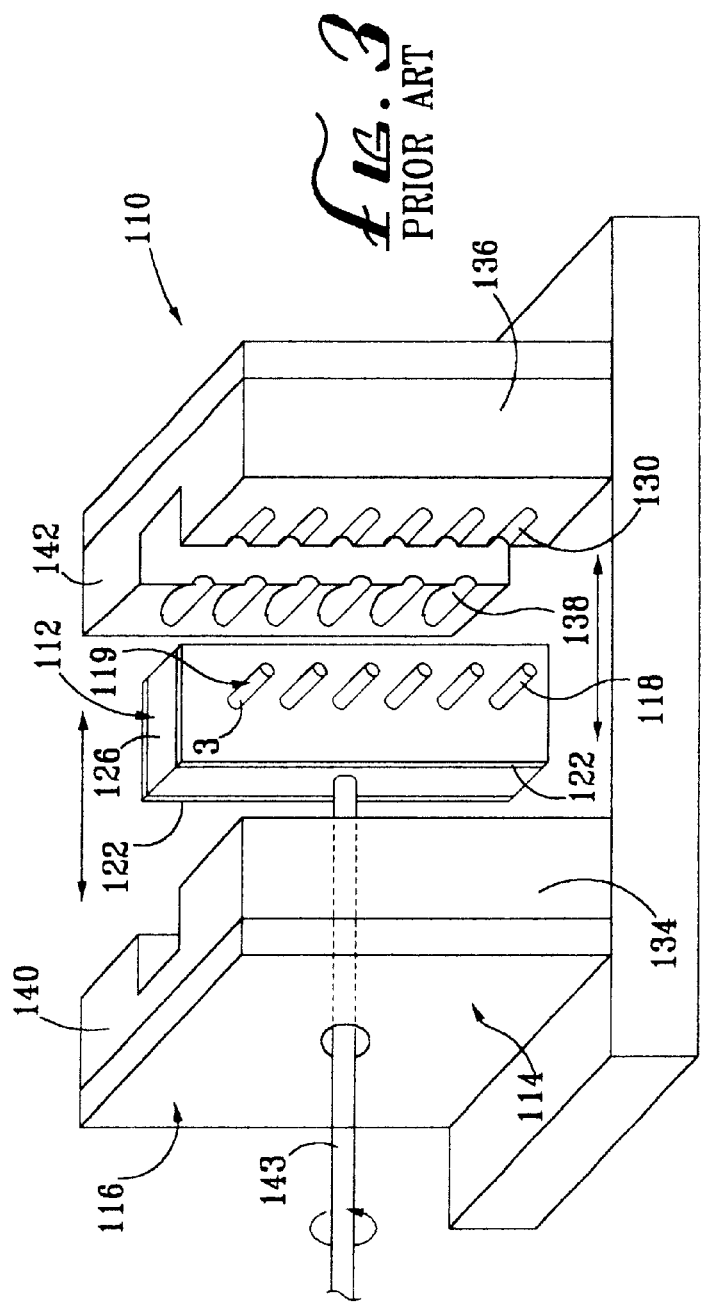

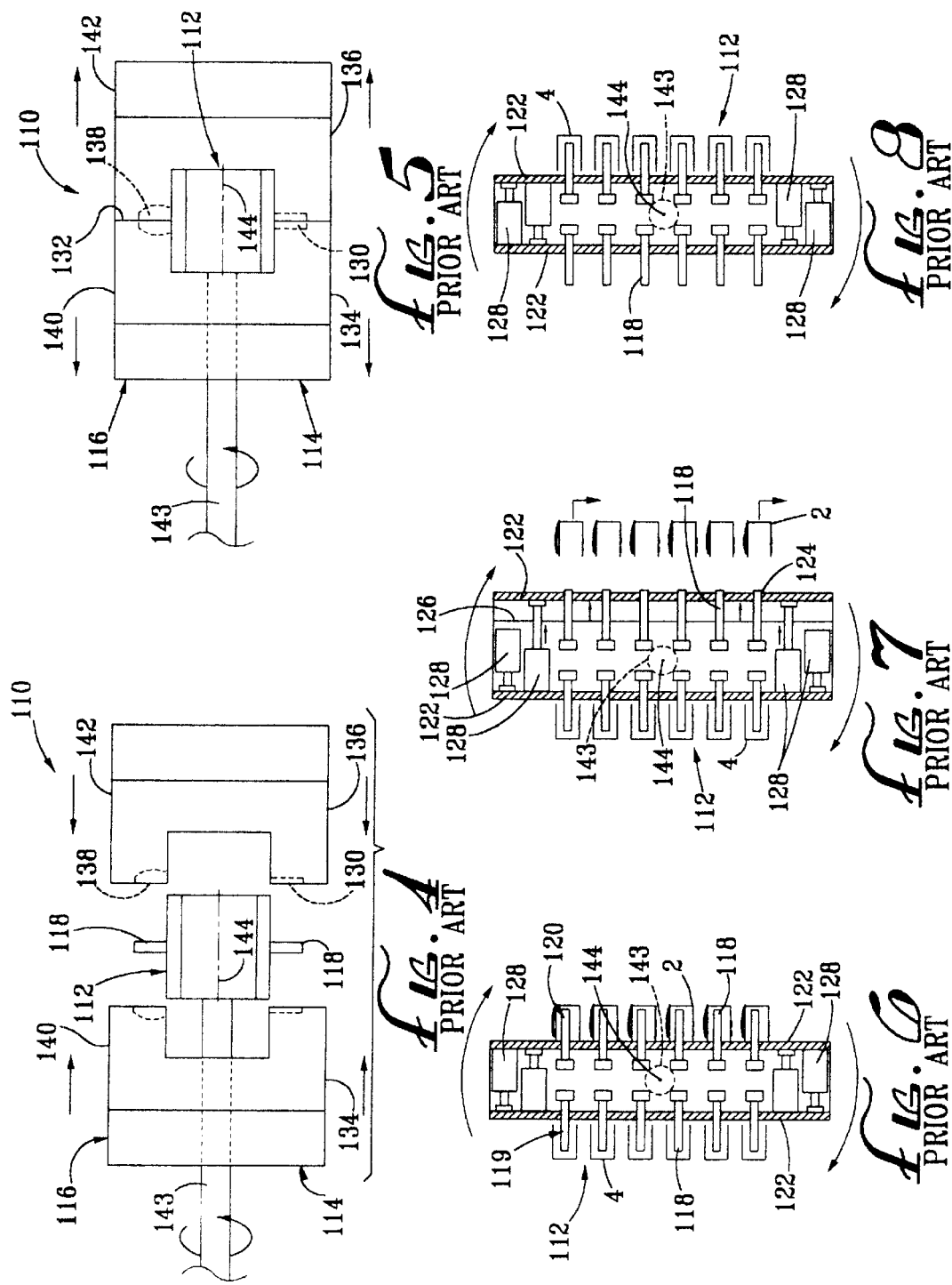

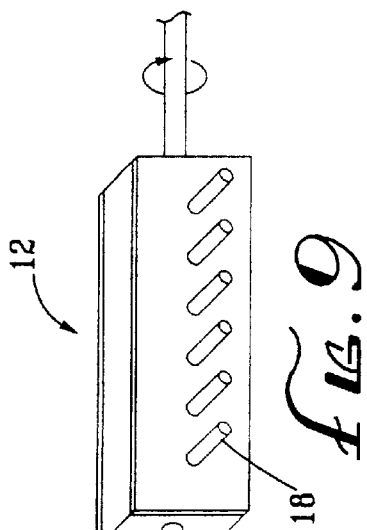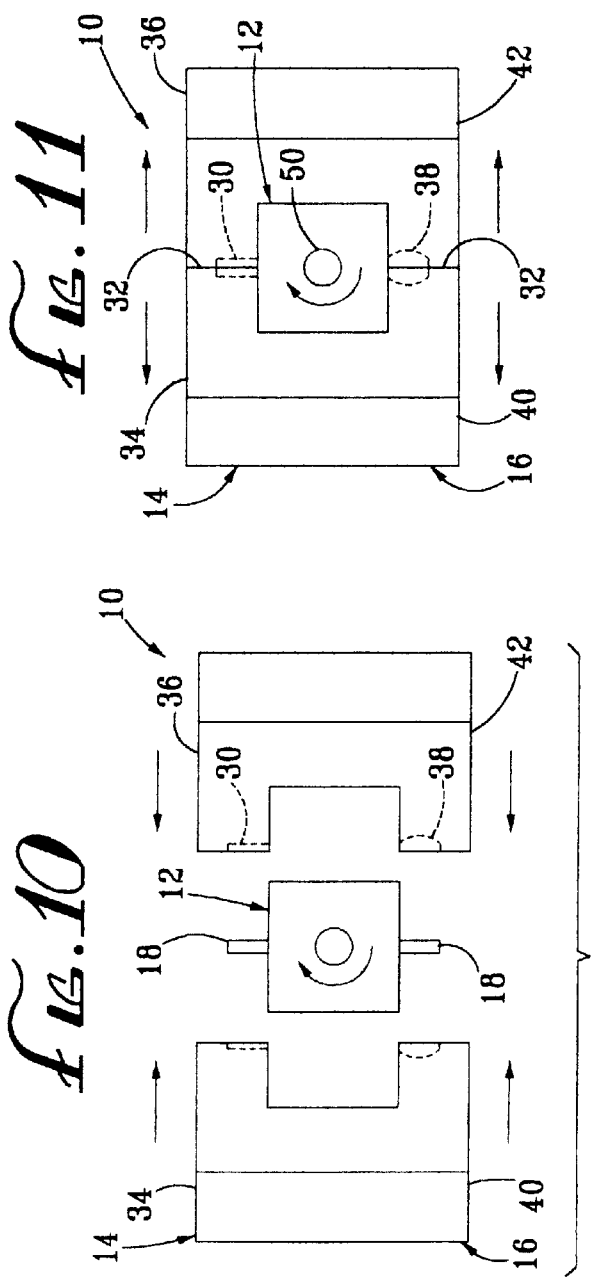

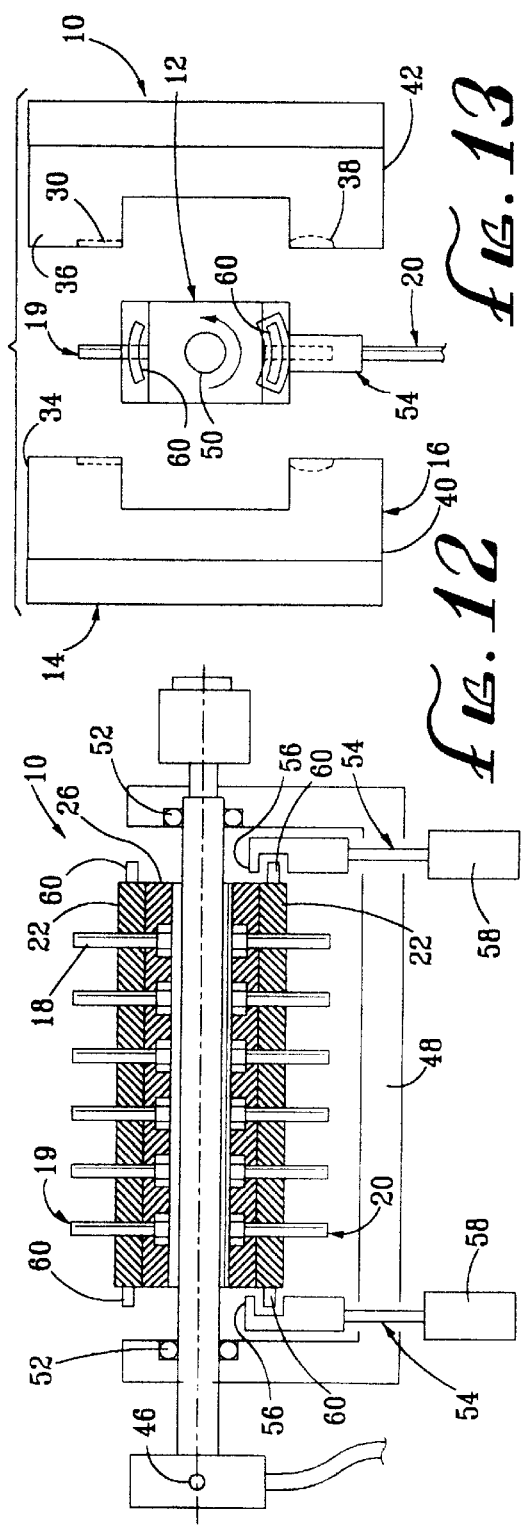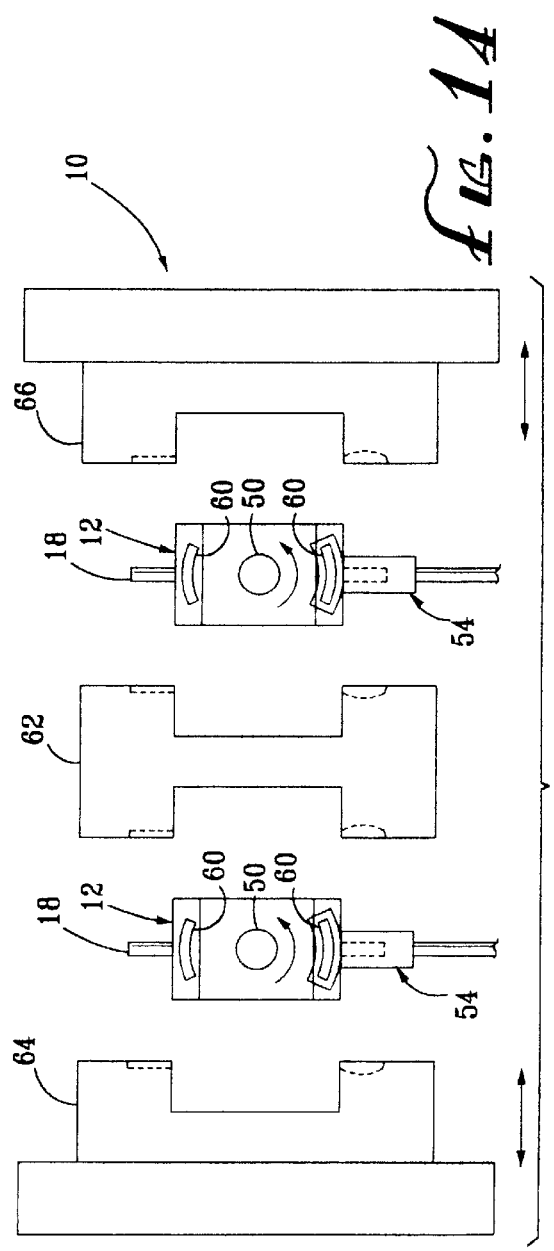

MULTI-COMPONENT MOLD

FIELD OF THE INVENTION

This invention relates generally to molds, and more particularly, to molds capable of forming a multi-component product.

BACKGROUND OF THE INVENTION

Multi-component molded products have become very popular. In a typical multi-component molded product, a first component is molded in a first stage. Thereafter, a second component is molded onto the first component in a second stage. Additional components can be added in similar additional stages.

A typical multi-component mold system of the prior art is illustrated in FIGS. 3–8 of the application. Such prior art system has a turret with multiple pairs of product connection units disposed on opposite sides of the turret. The turret is rotatable about its central transverse axis. First components of a product are molded in a first set of mold cavities located proximate to one side of the turret. After the first components are thus molded, the turret is rotated 180° and a second component is molded onto each of the first component using a second set of mold cavities disposed on the opposite side of the turret.

The problem with such prior art multi-component mold systems is that the turret is difficult to rotate quickly. This is especially true as the number of product connection pairs attached to the turret increases. Once the length of the turret gets beyond about 3 feet, rotating the turret within the tight time constraints of high speed modern mold systems, requires excessively large rotating equipment and consumes excessive amounts of power.

Accordingly, there is a need for a multi-component mold system which avoids these problems with the prior art—in an efficient and relatively inexpensive manner.

SUMMARY

The invention satisfies this need. The invention is an apparatus for making multi-component products. The apparatus comprises (a) an elongate turret having a front side, an opposed rear side and a longitudinal axis, (b) a plurality of product connector pairs, each product connector pair comprising a forward product connector on the front side of the turret and a rearward product connector on the rear side of the turret, the forward product connector and the rearward product connector being disposed in a plane substantially perpendicular to the longitudinal axis of the turret, (c) at least one bearing for permitting the rotation of the turret about its longitudinal axis, (d) a first mold disposed proximate to the turret, the first mold defining a plurality of first mold cavities, each first mold cavity being aligned with a product connector on the turret and each first mold cavity being sized and dimensioned to shape the exterior surface of the first molded layer of the product, the first mold being separable along a first mold separation plane which bisects each of the first mold cavities within the first mold, and (e) a second mold disposed proximate to the turret and opposite the turret from the first mold, the second mold defining a plurality of second mold cavities, each second mold cavity being aligned with a product connector on the turret and each second mold cavity being sized and dimensioned to shape the exterior surface of the second molded layer of the product, the second mold being separable along a second mold separation plane which bisects each of the second mold cavities within the second mold.

DRAWINGS

These features, aspects and advantages of the present invention will become better understood with regard to the following description, appended claims and accompanying figures where:

FIG. 1 is a perspective view of a first component of a multi-component product which can be manufactured by the invention;

FIG. 2 is a perspective view of a fully completed multi-component product which can be manufactured by the invention;

FIG. 3 is a perspective view of a typical prior art mold apparatus for making multi-component products;

FIG. 4 is a top view of the prior art apparatus illustrated in FIG. 3 showing the molds in the open position;

FIG. 5 is a top view of the prior art apparatus illustrated in FIG. 3 showing the molds in the closed position;

FIG. 6 is a side view of a turret used in the prior art mold illustrated in FIG. 3 showing completed one-component and two-component products appended thereto;

FIG. 7 illustrates the prior art turret shown in claim 6 showing the turret rotated 90° and showing the two-component products gravitating away from the turret;

FIG. 8 illustrates the prior art turret shown in FIG. 6 rotated 180° and showing only one component products attached thereto;

FIG. 9 is a perspective view of a turret usable in the invention;

FIG. 10 is a top view of a mold apparatus having features of the invention, showing the molds in the open position;

FIG. 11 is a top view of the mold apparatus illustrated in FIG. 10, showing the molds in the closed position;

FIG. 12 is a side view in partial cross-section of another mold apparatus having features of the invention;

FIG. 13 is an end view of the mold apparatus illustrated in FIG. 12; and

FIG. 14 is yet another mold apparatus having features of the invention.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention 10 is an apparatus for making multi-component products 2 comprising a first molded layer 4 and a second molded layer 6. A typical multi-component product 2 is illustrated in FIGS. 1 and 2 of the drawings. In FIGS. 1 and 2, the multi-component product is a hollow cover for a ballpoint pen. The product 2 comprises a first molded layer 4 having a hollow tubular configuration with a closed first end 7 and an open second end 8. The second molded layer 6 is disposed over the first molded layer 4 and provides the clip portion of the ballpoint pen cover. In a typical embodiment, the first molded layer 4 and the second molded layer 6 are molded from plastic materials of differing colors.

The invention 10 is best understood when contrasted with prior art apparatuses for making multi-component products 2. A typical such prior art apparatus 110 is illustrated in FIGS. 3–8. This typical prior art apparatus 110 comprises an elongate turret 112 disposed between a first mold 114 and a second mold 116. The turret 112 has a plurality of product connector pairs. In the drawings, such product connector 118 within the product connector pairs 3 are mandrels sized and dimensioned to shape the interior cavity of the hollow first molded layer 4, such as illustrated in FIG. 1. The product connectors 118 disposed most proximate to the first mold 114 shall be referred to herein as the first set of product connectors 119, and the product connectors 118 disposed most proximate to the second mold 116 shall be referred to as the second set of product connectors 120.

The turret 112 further comprises a pair of opposed stripper plates 122. The stripper plates 122 have apertures 124 to accommodate the product connectors 118. Each of the stripper plates 122 can be extended away from the main body 126 of the turret 112 by means of a pair of stripper plate extension pistons 128 disposed at opposite ends of the turret 112. The stripper plates 122 are used to strip products 2 off of the product connectors 118 as illustrated in FIG. 7.

The first mold 114 defines a plurality of first mold cavities 130. Each of the first mold cavities 130 is aligned with a product connector 118 on the turret 112. Each of the first mold cavities 130 is sized and dimensioned to shape the exterior surface of the first molded layer 4 of the product 2. The first mold 114 is separable along a mold separation plane 132. In the embodiment illustrated in the drawings, the first mold 114 is separable into a left first mold moiety 134 and a right first mold moiety 136.

The second mold 116 defines a plurality of second mold cavities 138 aligned with product connectors 118 on the turret 112. Each of the second mold cavities 138 is sized and dimensioned to shape the exterior surface of the second molded layer 6 of the product 2. The second mold 116 is separable along the mold separation plane 132 into a left second mold moiety 140 and a right second mold moiety 142.

The two moieties of both the first mold 114 and the second mold 116 are openable and closeable as illustrated in FIGS. 4 and 5.

The turret 112 is rotatable via a rotatable shaft 143 about the central transverse axis 144 of the turret 112. Because the turret 112 is rotatable, both the first and second sets of product connectors 119 and 120 can be alternatively moved into and out of the first mold 114 and the second mold 116.

In operation, the prior art apparatus 110 is moved from the open mold position (illustrated in FIG. 4) to the closed mold position (illustrated in FIG. 5). After moving to the closed position, the first mold cavities 130 wholly encompass the first set of product connectors 119, and the second mold cavities 138 wholly encompass the second set of product connectors 120. Molten plastic is injected into each of the first mold cavities 130. Thereafter, the molds 114 and 116 are separated (as illustrated in FIG. 4) and the turret 112 is rotated 180°. The molds 114 and 116 are then closed again and new molten plastic is injected into the first mold cavities 130 to form additional first molded layers 4 about the second set of product connectors 120. At the same time, different molten plastic is injected into the second mold cavities 138 to create a second molded layer 6 onto each of the previously completed first molded layers 4. This stage in the operation is illustrated in FIG. 6. Next, as illustrated in FIG. 7, the stripper plate 122 proximate to the completed multi-component products 2 is extended to eject completed multi-component products 2 from the first set of product connectors 119. Thereafter, the turret 112 is rotated 180°, as illustrated in FIG. 8. At this point, the first set of product connectors 119 are ready to accept new first molded layers 4 while the second set of product connectors 120 is ready to accept second molded layers 6.

The problem with such prior art apparatuses is that, as the number of product connectors 118 along the turret 112 increases in number, the length of the turret 112 increases. Because the turret 112 is rotated about its central transverse axis 144, the increased length of the turret 112 requires a great deal of energy to rotate the turret 112 rapidly. The necessity to apply excessive amounts of energy to the rotation of the turret 112 also requires that the apparatus 110 be excessively large. The problem of rotating the turret 112 is exacerbated by the necessity of disposing the stripper plate extension pistons 128 at opposite ends of the turret 112. Having to make room within the turret 122 for the stripper plate extension pistons 128 necessarily extends the overall length of the turret 112.

Turning now to the invention which is illustrated in FIGS. 9–14, the apparatus of the invention 10 also comprises an elongate turret 12 disposed between a first mold 14 and a second mold 16. Like turrets 112 of the prior art, the turret 12 of the invention 10 also comprises a plurality of product connector pairs. In the drawings, each product connector 18 with the product connector pairs are shown as mandrels which are sized and dimensioned to shape the interior cavity of a hollow first molded layer 2 such as illustrated in FIG. 1. As was the convention in describing the prior art apparatus 110, the product connectors 18 disposed most proximate to the first mold 14 of the invention 10 shall be referred to herein as the first set of product connectors 19, and the product connectors 18 disposed most proximate to the second mold 16 of the invention 10 shall be referred to as the second set of product connectors 20.

The fundamental difference between the apparatus 110 of the prior art and the apparatus 10 of the invention is that, in the apparatus 10 of the invention, the turret 12 is rotated about its longitudinal axis 46, rather than about its central transverse axis.

The turret 12 can be disposed vertically or horizontally. In the drawings, the turret 12 is shown as being disposed in a horizontal orientation.

Like in the molds used in the prior art apparatus 10 described above, the first mold 14 used in the invention 10 defines a plurality of first mold cavities 30. Each of the first mold cavities 30 is aligned with a product connector 18 on the turret 12. Each of the first mold cavities 30 is sized and dimensioned to shape the exterior surface of the first molded layer 4 of the product 2. The first mold 14 is separable along a mold separation plane 32. In the embodiment illustrated in the drawings, the first mold 14 is separable into a left first mold moiety 34 and a right first mold moiety 36. Likewise, the second mold 16 of the invention 10 also defines a plurality of second mold cavities 38 aligned with product connectors 18 on the turret 12. Each of the second product cavities 38 is sized and dimensioned to shape the exterior surface of the second molded layer 6 of the product 2. The second mold 16 is separable along the mold separation plane 32 into a left second mold moiety 40 and a right second mold moiety 42. The two moieties of the first and second molds 114 and 116 are openable and closeable as illustrated in FIGS. 10 and 11.

FIGS. 12 and 13 illustrate a typical apparatus 10 of the invention. The turret 12 is disposed on a turret carriage 48. A turret shaft 50 is disposed along the longitudinal axis 46 of the turret 12. The turret shaft 50 is supported at opposite ends by bearings 52 which allow the shaft 50 to rotate about the longitudinal axis 46 of the turret 12.

FIGS. 12 and 13 also illustrate a unique stripper plate extension design usable in the invention. In this design, stripper plates 22 disposed on opposite sides of the turret 12 are extended and retracted by opposed stripper plates extender members 54 disposed apart from the turret 12. Typically, the stripper plate extender members 54 will be attached to the turret carriage 48. As illustrated in FIGS. 12 and 13, the stripper plate extender members 54 comprise a hooking flange 56 disposed at the end of a hydraulic cylinder 58. The hooking flange 56 is sized and dimensioned to engage one of two catch members 60 disposed on opposite ends of each stripper plate 22. Upon engaging the catch members 60 of a stripper plate 22 with the stripper plate extender members 54, the stripper plate extender members 54 can be retracted to extend the stripper plate 22 away from the turret 12. The advantage of using this unique stripper plate extension design is that the hydraulic cylinders 58 used to extend the stripper plate extension members 54 are not located within the turret 12, and therefore do not add to the weight of the turret 12. The decreased weight of the turret 12 means a decrease of angular momentum in the rotation of the turret 12.

FIG. 14 illustrates an alternative embodiment of the invention 10 which includes in combination a pair of turrets 12 rotatable on either side of a fixed, multi-sided mold member 62 which cooperates with a left side moveable mold member 64 and with a right side moveable mold member 66. As can be seen, the combination of the multi-sided mold member 62 and the left and right side moveable mold members 66 provide four individual molds.

In operation, the apparatus 10 of the invention is moved from the first mold position (illustrated in FIG. 10) to the closed mold position (illustrated in FIG. 11). After moving to the closed position, the first mold cavities 30 wholly encompass the first set of product connectors 19, and the second mold cavities 38 wholly encompass the second set of product connectors 20. Molten plastic is injected into each of the first mold cavities 30. Thereafter, the molds 14 and 16 are separated (as illustrated in FIG. 10) and the turret 12 is rotated 180°. As the turret 12 is rotated 180°, the stripper plate extender members 54 are extended as illustrated in FIG. 12 so that the catch members 60 are engaged within the hooking flanges 56 on each of the two stripper plate extender members 54. The molds 14 and 16 are then closed again and new molten plastic is injected into the first mold cavities 30 to form additional first mold layers 4 about the second set of product connectors 20. At the same time, different molten plastic is injected into the second mold cavities 38 to create a second molded layer 6 onto each of the previously completed first molded layers 4. Then, the stripper plate extender members 54 are retracted so as to pull downwardly the lowermost stripper plate 22 from the main body 26 of the turret 12. Apertures 24 within the stripper plate 22 allows the stripper plate 22 to extend downwardly along the exterior surfaces of the product connectors 18. By this action, completed multi-component products 2 are stripped from the first set of product connectors 19. Thereafter, the turret 12 is again rotated 180°. At this point, the first set of product connectors 19 are ready to accept new first molded layers 4 while the second set of product connectors 20 is ready to accept second molded layers 6. The turret 12 is continually rotated in the above manner, alternatively producing first molded layers 4 and completed products 2.

The invention has been found to provide an effective multi-component mold system which avoids the problems of the prior art. Because the turret assembly in the invention is rotatable around the longitudinal axis of the turret, the turret can be of virtually unlimited length and still be easily and quickly rotatable between opposed mold units.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An apparatus for making products, each of which products comprises a first molded layer and a second molded layer, the apparatus comprising:

(a) an elongate turret having a front side, an opposed rear side and a longitudinal axis;

(b) a plurality of product connector pairs, each product connector pair comprising a forward product connector on the front side of the turret and a rearward product connector on the rear side of the turret, the forward product connector and the rearward product connector being disposed in a plane substantially perpendicular to the longitudinal axis of the turret;

(c) at least one bearing for permitting the rotation of the turret about its longitudinal axis;

(d) a first mold disposed proximate to the turret, the first mold defining a plurality of first mold cavities, each first mold cavity being aligned with a product connector on the turret and each first mold cavity being sized and dimensioned to shape the exterior surface of the first molded layer of the product, the first mold being separable along a first mold separation plane which bisects each of the first mold cavities within the first mold;

(e) a second mold disposed proximate to the turret and opposite the turret from the first mold, the second mold defining a plurality of second mold cavities, each second mold cavity being aligned with a product connector on the turret and each second mold cavity being sized and dimensioned to shape the exterior surface of the second molded layer of the product, the second mold being separable along a second mold separation plane which bisects each of the second mold cavities within the second mold;

wherein the turret comprises a body having opposed side walls and a pair of stripper plates disposed on opposite sides of the body, each of the stripper plates having a plurality of stripper plate apertures, each of the product connectors being affixed to the body and extending through a stripper plate aperture, each stripper plate being movable between a retracted stripper plate position wherein the stripper plate is proximal to the body and an extended stripper plate position wherein the stripper plate is distal from the body, each stripper plate having at least one stripper plate attachment member, the apparatus further comprising:

at least one stripper plate extender member disposed separate from the turret, the at least one stripper plate extender member being attachable to the at least one stripper plate attachment member on each of the stripper plates, the at least one stripper plate extender member being movable between a first stripper plate extender member position wherein the at least one stripper plate extender member is proximal to the turret and a second stripper plate extender member position wherein the at least one stripper plate extender member is distal from the turret, the at least one stripper plate extender member being alternatively attachable to and deattachable from the at least one stripper plate attachment member on each of the two stripper plates, so that, the at least one stripper plate extender member can be (i) moved from the first stripper plate extender member position to the second stripper plate extender member position, (ii) attached to the at least one stripper plate attachment member on one of the two stripper plates, (iii) moved from the second stripper plate extender member position to the first stripper plate extender member position, thereby moving the one of the two stripper plates from the retracted stripper plate position to the extended stripper plate position, (iv) moved from the first stripper plate extender member position to the second stripper plate extender member position, thereby moving the one of the two stripper plates from the extended stripper plate position to the retracted stripper plate position, (v) detached from the at least one stripper plate attachment member, and (vi) returned to the first stripper plate extender member position.

2. The apparatus of claim 1 wherein the product connectors are mandrels sized and dimensioned to shape an interior surface of the first molded layer, each mandrel being elongate and having a longitudinal axis disposed perpendicular to the longitudinal axis of the turret.

3. The apparatus of claim 1 wherein the apparatus comprises a pair of opposed stripper plate extender members.

4. The apparatus of claim 1 wherein the at least one stripper plate extender member comprises a hooking flange.

* * * * *